United States Patent
Gukelberger et al.

(10) Patent No.: US 9,200,599 B2
(45) Date of Patent: Dec. 1, 2015

(54) INTERNAL COMBUSTION ENGINE HAVING DUAL EGR LOOPS (DEDICATED EGR LOOP AND LOW PRESSURE EGR LOOP) AND DUAL CYLINDER INTAKE PORTS

(71) Applicant: Southwest Research Institute, San Antonio, TX (US)

(72) Inventors: Raphael Gukelberger, San Antonio, TX (US); Jess W. Gingrich, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 299 days.

(21) Appl. No.: 13/862,797

(22) Filed: Apr. 15, 2013

(65) Prior Publication Data
US 2014/0305416 A1 Oct. 16, 2014

(51) Int. Cl.
*F02B 47/08* (2006.01)
*F02M 25/07* (2006.01)

(52) U.S. Cl.
CPC ....... *F02M 25/0707* (2013.01); *F02M 25/0709* (2013.01); *F02M 25/0727* (2013.01); *F02M 25/0749* (2013.01); *F02M 25/074* (2013.01); *Y02T 10/121* (2013.01)

(58) Field of Classification Search
CPC . F02M 25/0749; F02M 25/07; F02M 35/112; F02M 25/0227; F02M 25/0709; F02D 41/0065; F02D 41/0087
USPC ............... 123/568.21, 568.11, 568.12, 568.2, 123/568.14
See application file for complete search history.

(56) References Cited

U.S. PATENT DOCUMENTS

| | | | |
|---|---|---|---|
| 6,945,236 B2* | 9/2005 | Nakai | F02B 31/085 123/568.12 |
| 8,020,539 B2* | 9/2011 | Maunoury | F02M 25/0723 123/302 |
| 8,291,891 B2* | 10/2012 | Alger, II | F02D 13/0238 123/315 |
| 2005/0000497 A1* | 1/2005 | Nakai | F02B 31/085 123/568.12 |
| 2009/0017320 A1* | 1/2009 | Donelson et al. | 428/482 |
| 2009/0173320 A1* | 7/2009 | Maunoury | F02M 25/0723 123/568.18 |
| 2009/0199825 A1* | 8/2009 | Piper | F02D 9/04 123/568.21 |
| 2012/0023933 A1* | 2/2012 | Ulrey | F02D 13/0249 60/605.2 |
| 2012/0078492 A1* | 3/2012 | Freund et al. | 701/108 |
| 2012/0198822 A1* | 8/2012 | Massard | F01N 13/107 60/280 |
| 2013/0283789 A1* | 10/2013 | Pursifull | F01N 13/009 60/605.2 |
| 2014/0102429 A1* | 4/2014 | Hayman | F02M 35/10222 123/568.18 |
| 2014/0196697 A1* | 7/2014 | Burrahm | F02M 25/0718 123/568.11 |

* cited by examiner

*Primary Examiner* — Lindsay Low
*Assistant Examiner* — Long T Tran
(74) *Attorney, Agent, or Firm* — Livingston Law Firm

(57) ABSTRACT

A dual EGR loop exhaust gas recirculation (EGR) system for an internal combustion engine. The engine has both a dedicated EGR loop and a low pressure EGR loop. This means that one or more engine cylinders is operable as a dedicated EGR cylinder, such that all of its exhaust is recirculated via the dedicated EGR loop. The other cylinders are operable as main cylinders having two intake ports, such that each main cylinder may receive a mixture of fresh air and dedicated EGR through one intake port and a mixture of fresh air and low pressure EGR through the other intake port. A control unit controls this dual loop EGR system to either provide EGR only from the dedicated EGR loop or to also provide additional EGR from the low pressure EGR loop.

15 Claims, 5 Drawing Sheets

INTERNAL COMBUSTION ENGINE HAVING DUAL EGR LOOPS (DEDICATED EGR LOOP AND LOW PRESSURE EGR LOOP) AND DUAL CYLINDER INTAKE PORTS

TECHNICAL FIELD OF THE INVENTION

This invention relates to internal combustion engines, and more particularly to an exhaust gas recirculation system having one or more dedicated EGR cylinders.

BACKGROUND OF THE INVENTION

For many internal combustion engines, their engine control strategy has three important parameters: spark timing (or fuel injection timing in a diesel engine), the exhaust gas recirculation (EGR) rate and the air/fuel ratio (AFR).

To implement EGR, a fraction of the exhaust gas is recycled from the exhaust system back to the intake system. The recirculated exhaust gas is mixed with the fresh fuel-air mixture before entering the cylinders. EGR can be implemented in internal and external configurations. External configurations can be implemented as either a high pressure or low pressure loop when boosting with a turbocharger, depending on whether the recirculated exhaust is introduced to the intake post compressor (high pressure loop) or pre-compressor (low pressure loop).

EGR has a long history of use in both diesel and spark-ignited engines. It affects combustion in several ways. The combustion is cooled by the presence of exhaust gas, that is, the recirculated exhaust gas absorbs heat. The dilution of the oxygen present in the combustion chamber reduces the production of NOx. Also, if exhaust gas is being recirculated, less air is breathed by the engine, reducing the amount of exhaust gas produced.

As a relatively simple and low cost technology, EGR can be expected to be widely used on all types of engines. Of particular interest is that EGR can reduce the need for fuel enrichment at high loads in turbocharged engines and thereby improve fuel economy.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to systems and methods for use with an internal combustion engine having dedicated EGR. In a "dedicated EGR" engine, one or more of the engine's cylinders are used to generate exhaust gas, all of which is recirculated to the intake charge of the engine.

The dedicated EGR may be produced by a cylinder having a single exhaust port that opens only to an EGR loop. The other cylinders produce "normal" exhaust, i.e., exhaust that exits the engine via the tailpipe. U.S. Pat. No. 8,291,891, entitled "EGR System with Dedicated EGR Cylinders", to Alger, et al., describes a system that generates dedicated EGR in this manner and is incorporated by reference herein.

A feature of dedicated EGR is that the composition of the dedicated EGR exhaust gas may be controlled to be different from that of the exhaust of the non-dedicated cylinders. For example, the dedicated EGR cylinder(s) may be run more rich to provide EGR that improves combustion on all cylinders.

The description below is specifically directed to an internal combustion engine having "dual EGR loops". More specifically, the engine has both a dedicated EGR loop that recirculates exhaust from a dedicated EGR cylinder and a low pressure EGR loop that recirculates exhaust from the main cylinders. Each of the main cylinders has two intake ports, one connected to a first intake path that includes the dedicated EGR loop and the other connected to a second intake path that includes the low pressure EGR loop.

As explained further below, this dual EGR loop design retains the combustion benefits of having a dedicated EGR loop while increasing the amount and flexibility of EGR operation. Engine operation is not limited to a fixed EGR rate; the low pressure EGR loop allows the use of additional EGR without detriment to combustion efficiency. Because EGR dilution from the low pressure loop is only added to the non-dedicated EGR cylinders, the dedicated EGR cylinder can still operate at the most optimal fuel dilution level to produce EGR enhanced with H2 and CO. The dual EGR loop design allows increased EGR rates for reduced pumping losses and heat transfer while retaining good combustion efficiency and cylinder-to-cylinder balance.

Figure 1:
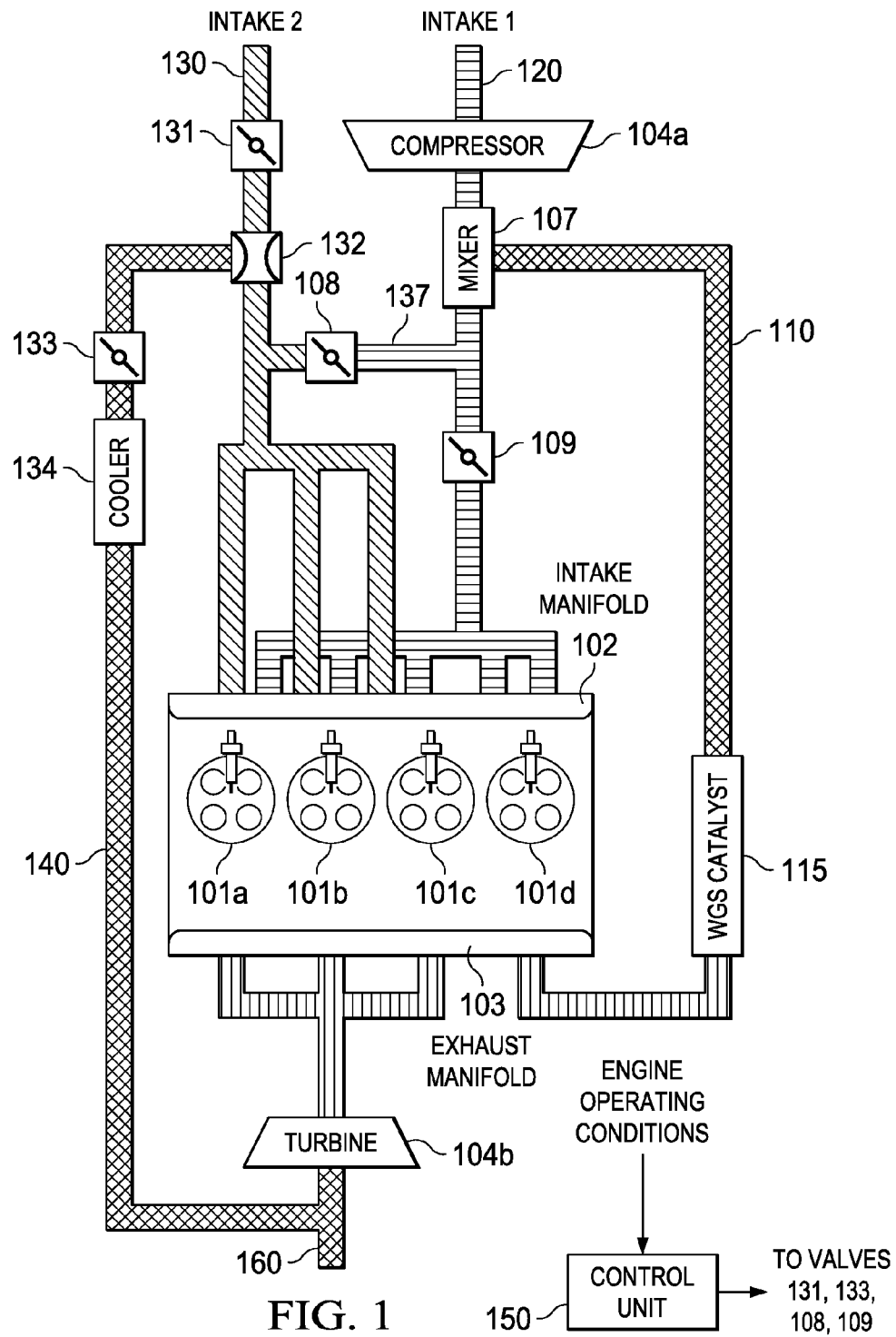
FIG. 1 illustrates an internal combustion engine having a dedicated EGR cylinder, an additional low pressure EGR loop, and dual cylinder intake ports.

FIG. 1 illustrates an internal combustion engine 100 having dual EGR loops and dual cylinder intake ports in accordance with the invention. One of the EGR loops is referred to here as the "dedicated EGR loop" 110 and the other as the "low pressure EGR loop" 140.

Engine 100 has four cylinders 101a-101d. One of the cylinders is a dedicated EGR cylinder, and is identified as cylinder 101d. In other embodiments, there may be a different number of engine cylinders 101, and/or there may be more than one dedicated EGR cylinder 101d. As stated above, in general, in a "dedicated EGR" engine configuration, all of the exhaust of a sub-group of cylinders is routed back to the engine intake.

Engine 100 is equipped with a turbocharger having a compressor 104a and a turbine 104b. Although not explicitly shown, the cylinders 101a-101d have some sort of fuel delivery system for introducing fuel into the cylinders. This fuel delivery system can be fumigated, port injected, or direct injected.

The engine's fresh air intake system has two intake paths. Intake path 120 provides a mixture of fresh air and EGR from the dedicated EGR loop 110. The dedicated EGR loop 110 joins intake path 120 downstream the compressor 104a at a mixer 107. Intake path 130 provides a mixture of fresh air and EGR from the low pressure EGR loop 140. Intake path 130 may originate as either a fresh air intake separate from that into compressor 104a or maybe diverted from intake path 120. The low pressure EGR loop 140 joins intake path 130 at a mixer 132.

As stated above, each of the main (non dedicated EGR) cylinders 101a-101c has two intake ports into its combustion chamber. For each main cylinder, each of its two ports has an intake valve that is operable independently of the other port's intake valve. The cylinder intake may be implemented as a "split intake manifold". Other configurations of the intake manifold may be possible, so long as each main cylinder has means for separately receiving and controlling intake from the two intake paths 120 and 130.

On intake path 120, high quality dedicated EGR is rerouted and distributed to all cylinders 101, thereby significantly improving engine efficiency. Intake path 120 has a throttle 109 downstream mixer 107 to control the amount of intake. A water gas shift (WGS) catalyst 115 may be used to enhance the EGR composition.

On intake path 130, EGR coming from the low pressure EGR loop 140 is distributed only to the main cylinders 101a-101c. Intake path 130 has a throttle 131 upstream mixer 132 to control the amount of intake. A valve 133 downstream mixer 132 may be used to control or prevent the flow of exhaust through the low pressure EGR loop 140. A cooler 134 may be used to cool the low pressure EGR.

In the embodiment of FIG. 1, the main engine throttle 109 is located on the dedicated EGR intake line 120 downstream mixer 107. A connecting line 137 connects the dedicated EGR intake line 120 with the low pressure EGR intake line 130, downstream both mixers 107 and 132. A second throttle (or valve) 108 on the connecting line 137 may be used to control the relative flows from the two intakes. If valve 108 is closed, there is no fluid communication between the two intake paths.

As described above, the main cylinders 101a-101c have two intake ports, and in the example of FIG. 1, the dedicated EGR cylinder 101d also has two intake ports. In other embodiments, the dedicated EGR cylinder 101d could be configured with only one intake port.

In the example of this description, engine 100 is spark ignited, with each cylinder 101 having an associated spark plug (not shown), and its "normal" air-fuel ratio is stoichiometric. However, the methods described herein are also suitable for use with compression ignited engines. In general, the engine's non-dedicated EGR cylinders 101a-101c can be operated with whatever air-fuel ratio is appropriate for the engine and aftertreatment system.

In operation, if the low pressure EGR loop 140 is open, for each main cylinder 101a-101c, one intake port delivers a mixture of fresh air and low pressure loop EGR into the combustion chambers of only the main cylinders. The other intake port delivers a mixture of fresh air and dedicated (high quality) EGR from the dedicated EGR cylinder. If the low pressure EGR loop 140 and intake throttle 131 are closed, all cylinders receive only fresh air mixed with dedicated EGR.

After entering the cylinders 101, the fresh-air/EGR mixture is ignited and combusts. After combustion, exhaust gas from each cylinder 101 flows through its exhaust port and into exhaust manifold 103. The engine may or may not have a conventional exhaust manifold 103, so long as exhaust may be directed to the dedicated EGR loop 110 or to the turbine 104b as described herein.

The exhaust of the dedicated EGR cylinder 101d is recirculated back to the intake manifold 102 via the dedicated EGR loop 110. The exhaust from the main cylinders flows through turbine 104b. After turbine 104b, exhaust gas may flow through the low pressure loop (if open) and/or out the tailpipe 160.

Assuming engine 100 is operated stoichiometrically, the dedicated EGR cylinder 101d can operate at any equivalence ratio because its exhaust will not exit the engine before passing through a non-dedicated EGR cylinder 101 operating at a stoichiometric air-fuel ratio. Because only stoichiometric exhaust leaves the engine, exhaust aftertreatment may be performed with a three way catalyst (not shown). In embodiments in which the engine system is a lean burn system, the exhaust from the non dedicated ("main") EGR cylinders will pass through an appropriate exhaust aftertreatment device, such as a lean NOx trap, NOx adsorber or selective reduction catalyst.

If a dedicated EGR cylinder 101d is run rich of stoichiometric A/F ratio, a significant amount of hydrogen (H2) and carbon monoxide (CO) may be formed. In many engine control strategies, this enhanced EGR is used to increase EGR tolerance by increasing burn rates, increasing the dilution limits of the mixture and reducing quench distances. In addition, the engine may perform better at knock limited conditions, such as low speed and high torque, due to increased EGR tolerance and the knock resistance provided by hydrogen (H2) and carbon monoxide (CO).

A control unit 150 has appropriate hardware (processing and memory devices) and programming for performing the methods described herein. In addition, control unit 150 may perform other tasks, such as overall EGR control, and may be integrated with a comprehensive engine control unit.

OPERATION AT VARYING ENGINE LOADS

Figure 2:
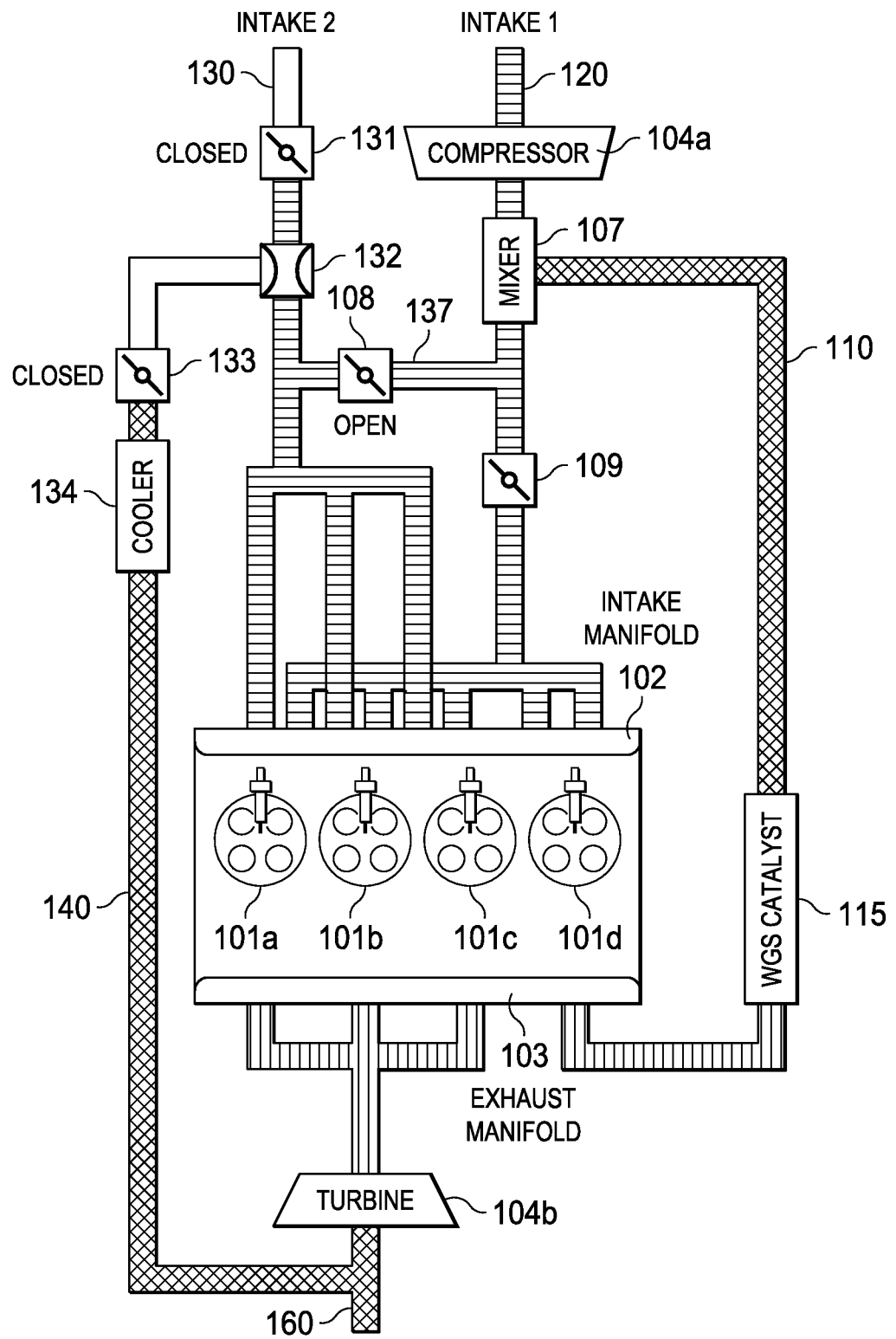
FIG. 2 illustrates operation of the engine of FIG. 1 during a "dedicated EGR only" mode.

FIG. 2 illustrates operation of engine 100 during a "dedicated EGR only" mode. In this mode, the low pressure EGR loop 140 is closed. This mode is typically used during high engine load conditions. It can also be used at lower engine speeds where additional EGR from the low pressure EGR loop 140 would limit engine peak torque.

When the engine is operated in this mode, valves 131 and 133 are closed. Valves 108 and 109 operate as engine throttles, and can be controlled independently to modulate the flow to the individual ports of the main cylinders. By opening valve 108 on connecting line 137, both intake ports of the main cylinders receive intake and pressure differences between them are alleviated.

The individual cylinder intake ports can be designed to generate different styles and/or levels of bulk motion (tumble, swirl). Their valves can be used to calibrate for optimum bulk motion across the operating range.

At part loads, individual intake valve actuation can also be used to enhance in-cylinder charge motion by restricting or closing the mass flow to one of the two intake valves.

Figure 3:
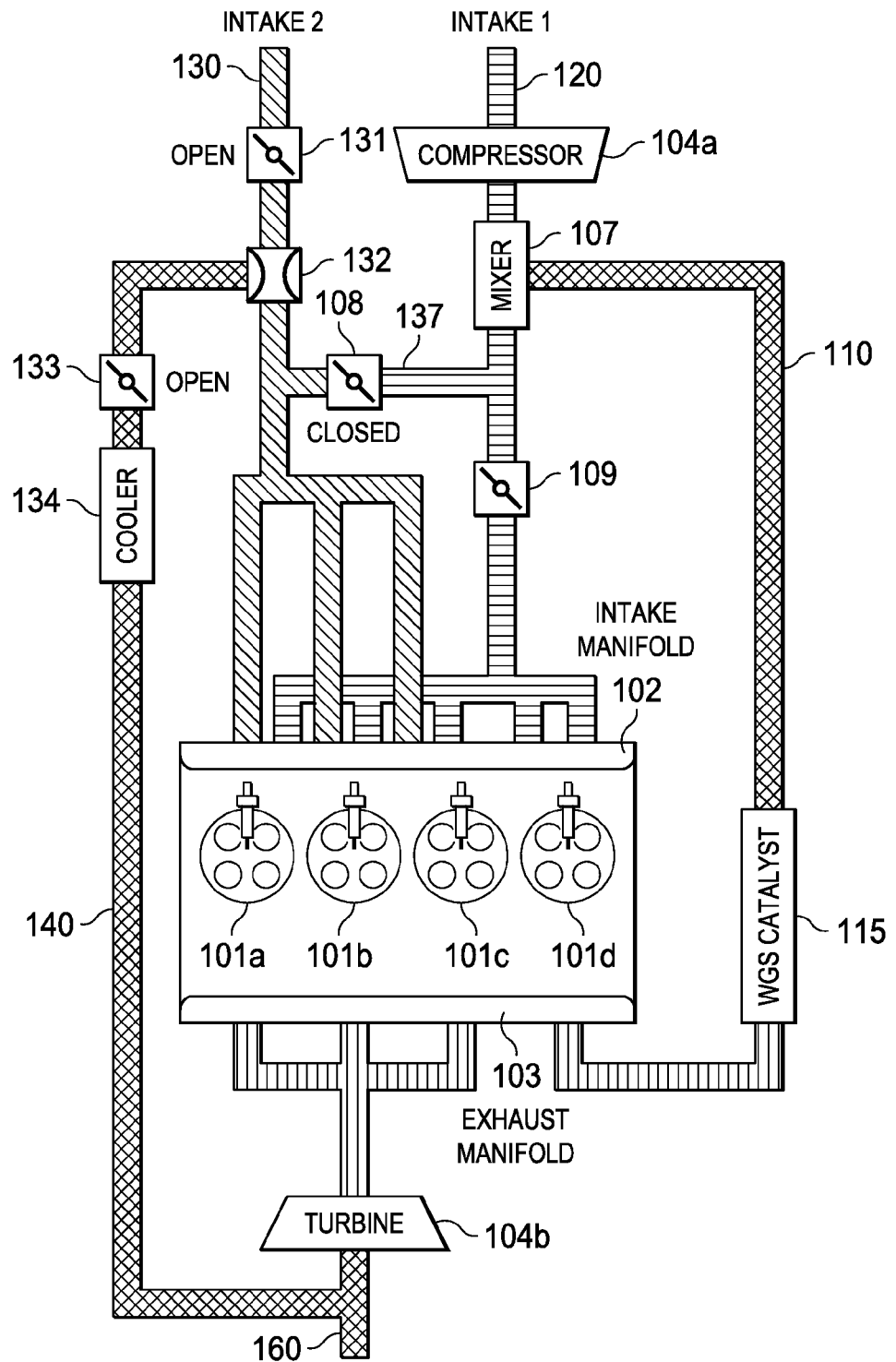
FIG. 3 illustrates operation of the engine of FIG. 1 during a "combined EGR mode".

FIG. 3 illustrates operation of engine 100 during a "combined EGR mode", which is typically used during low and medium engine load conditions. In this mode, in addition to dedicated EGR, the main cylinders receive some amount of EGR from the low pressure EGR loop 140 for further pumping work and heat transfer reduction. If sufficient boost is available, this mode can also be used at high engine loads to mitigate engine knock.

In the combined EGR mode, valve 108 is closed to physically separate the two intake paths 120 and 130. Valves 131 and 132 are fully or partially open, to control the amount of additional EGR provided to the cylinders. Control unit 150 controls these valves individually based on EGR and torque requirements.

The cylinder intake ports associated with intake path 130 (and thus conducting EGR from the low pressure EGR loop 140) can be designed to stratify the low pressure EGR toward the periphery of the combustion chambers. This enables higher dilution tolerance and reduces pumping losses.

As stated above, advantages of the above-described dual EGR loop design (with dual intake cylinder valves) are less pumping work and improved heat transfer improvement while maintaining combustion efficiency. In general, engine 100 runs best when the dedicated EGR cylinder 101d is operated at maximum fuel dilution. Increasing the EGR rates only in the main cylinders 101a-101c can yield further engine efficiency improvements through pumping work reduction, minimized heat transfer and enhanced knock tolerance.

If only a dedicated EGR loop is used, although it is desirable to operate the dedicated EGR cylinder 101d at a high equivalence ratio to produce increased hydrogen concentrations in the EGR, there is a limit to the equivalence ratio. However, by providing the stoichiometrically operated main cylinders 101a-101c with additional EGR from the low pressure EGR loop 140, the amount of excess fuel in the dedicated cylinder 101d can be significantly increased. This elevates hydrogen reformation and allows for stable combustion, pumping work, knock tolerance and heat transfer improvement while combustion efficiencies can be maintained.

Figure 4:
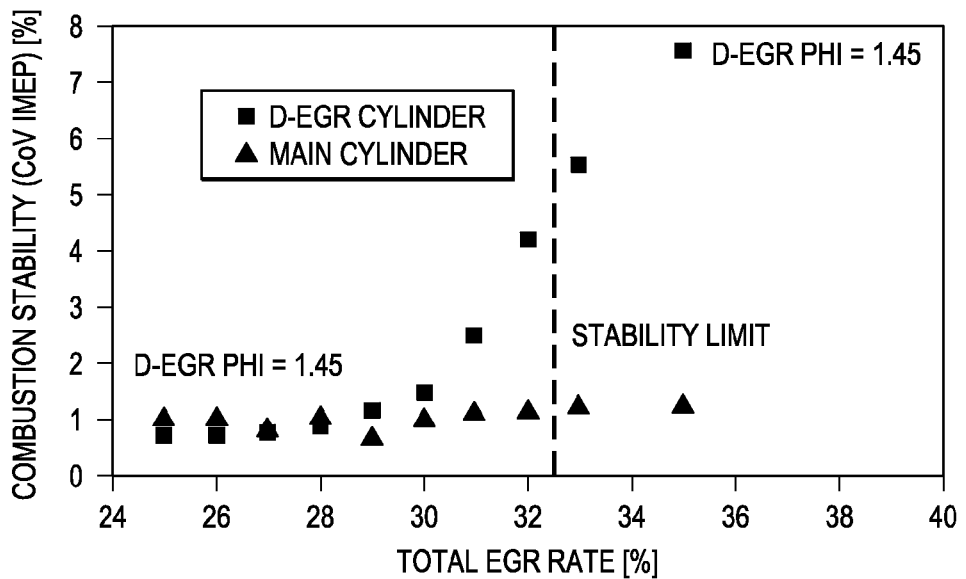
FIGS. 4 and 5 illustrate two scenarios in which EGR tolerance (and therefore engine efficiency) can be limited.
Figure 5:
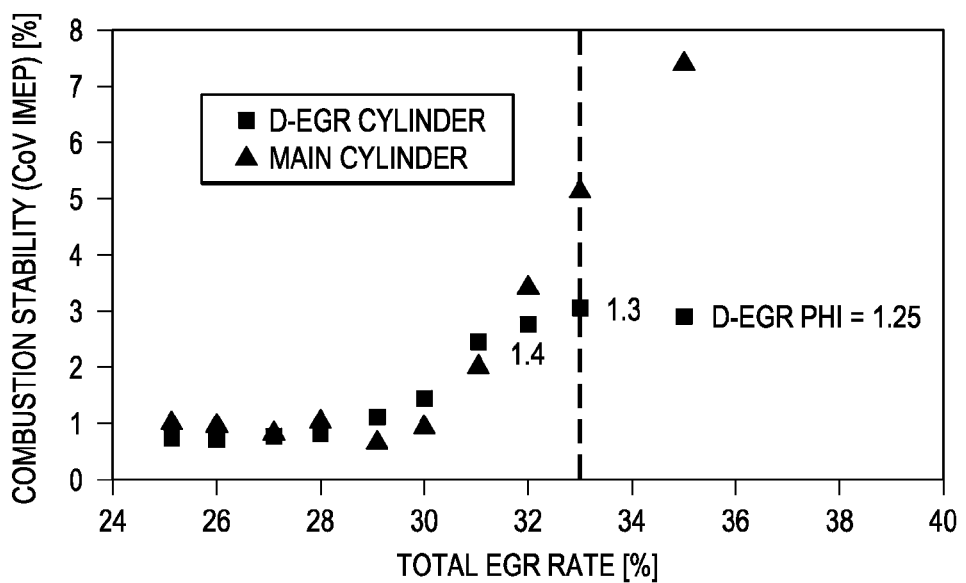
Figure 6:
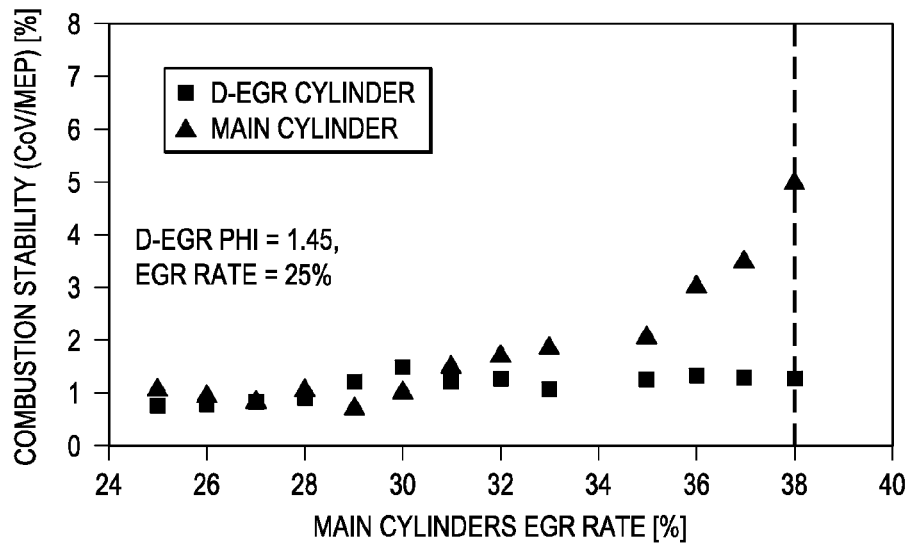
FIG. 6 illustrates how the dual EGR loop system and method overcome EGR limitations.

FIGS. 4 and 5 illustrate two scenarios in which EGR tolerance (and therefore engine efficiency) can be limited. FIG. 6 illustrates how the above-described dual EGR loop system and method overcome the limitation.

In FIG. 4, fuel dilution is held constant in the dedicated EGR cylinder 101d (D-EGR phi=1.45) and low pressure loop EGR is added to the entire engine (all 4 cylinders). At a certain EGR level, the dedicated EGR cylinder 101d becomes unstable and limits engine efficiency.

In FIG. 5, fuel dilution to the dedicated EGR cylinder 101d is removed as EGR increases to maintain stability in the dedicated EGR cylinder. In this scenario, the lower H2 and CO concentrations in the EGR limit the dilution tolerance of the main cylinders. As a result, engine efficiency is limited by the main cylinders.

FIG. 6 illustrates how the dual loop EGR design maintains engine stability, while allowing higher EGR rates in the main cylinders and higher H2 and CO production in the dedicated EGR cylinder. The net effect is lower fuel consumption for the entire engine.

Figure 7:
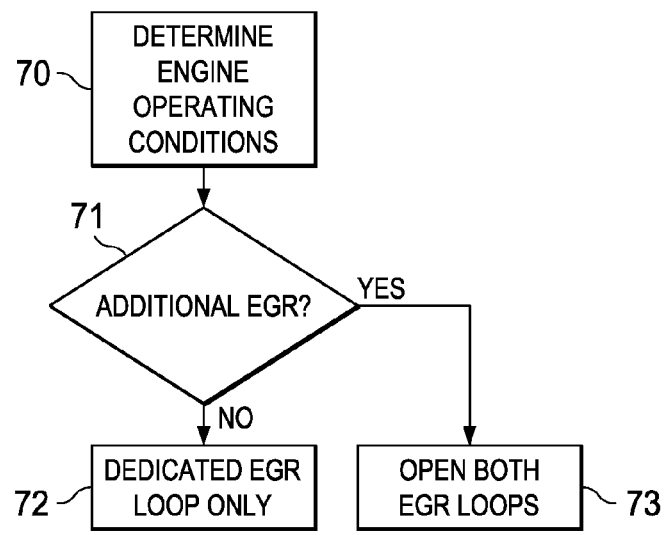
FIG. 7 illustrates a method of operating an engine having dual EGR loops and dual cylinder intake ports.

FIG. 7 illustrates a method of operating an engine having dual EGR loops and dual intake ports, such as the engine 100 of FIG. 1. The method is implemented with control unit 150, which is appropriately programmed, and has appropriate hardware and software for performing the steps of FIG. 7.

Control is performed on a cycle-by-cycle basis based on desired EGR flow. Control unit 150 receives data representing engine operating conditions and switches between modes of operation accordingly. Each mode actuates the intake valves to deliver the optimum amount of EGR dilution to the main cylinders and fuel dilution to the dedicated EGR cylinder for improved efficiency. Each mode can adjust the bulk motion of the charge my changing the proportion of mass flow through the two ports on the main cylinders. Spark timing is controlled to maintain optimum combustion phasing as the dilution rate changes Step 70 is determining engine operating conditions that affect the desired amount of EGR to the main cylinders. As discussed above, engine load is a primary factor. Determining the optimal level of EGR can also be a function of one or more of other various engine operating conditions such as speed, torque, boost pressure and EGR composition (H2 and CO), as well as fixed engine attributes such as compression ratio, peak cylinder pressure limit and boosting capability (turbocharger and/or supercharger). These operating conditions may be determined directly, such as by various sensing devices, or indirectly, such as by an ignition event. Additional parameters that may be used to determine desired EGR rates include those calculated or model-based from combined sensor inputs.

Control unit 150 is programmed to receive input data representing these engine conditions. Control unit 150 includes memory for storing data representing relationships between engine conditions and a desired EGR rate, so that the engine condition inputs can be used to determine a desired EGR rate output.

In Step 71, control unit 150 processes the inputs received in Step 70 and determines if an adjustment in the EGR rate is called for.

In Step 72, if only dedicated EGR is desired, here, for an EGR rate of 25%, control unit 150 delivers appropriate control signals to valves 131, 133, 108 and 109 as discussed above.

In Step 73, if additional EGR from the low pressure EGR loop as well as dedicated EGR are desired, control unit 150 delivers appropriate control signals to valves 131, 133, 108 and 109 as discussed above.

Assuming the four cylinder example of this description, when only the dedicated EGR loop is used, the EGR rate is 25%. When both the dedicated EGR loop and the low pressure EGR loop are used, the EGR rate in the main cylinders can be as high as 35% or more. This high EGR rate is achieved while maintaining maximum reformate production in the dedicated EGR cylinder.

What is claimed is:

1. A method of using exhaust gas recirculation (EGR) to improve combustion efficiency of an internal combustion engine having a number of cylinders, comprising:
    operating one or more of the cylinders as dedicated EGR cylinder(s), such that all exhaust from the dedicated EGR cylinders) is recirculated as dedicated EGR, and thereby operating the remaining cylinders as main cylinders;
    operating the dedicated EGR cylinder(s) at a different air-fuel ratio than the main cylinders;
    providing a dedicated EGR loop for delivering the dedicated EGR to all cylinders;
    providing a low pressure EGR loop for delivering recirculated low pressure loop EGR from the main cylinders back to the main cylinders;
    operating the main cylinders to receive a mixture of fresh air and dedicated EGR gas, or to receive a mixture of fresh air, dedicated EGR gas and low pressure loop EGR gas;
    providing each main cylinder with two intake ports, such that each main cylinder may receive a mixture of fresh air and dedicated EGR through one intake port and a mixture of fresh air and low pressure EGR through the other intake port;
    determining a desired EGR rate;
    based on the desired EGR rate, providing EGR to all cylinders only from the dedicated EGR loop or also providing additional EGR to at least the main cylinders from the low pressure EGR loop.

2. The method of claim 1, wherein the engine's non dedicated EGR cylinder(s) are run stoichiometrically.

3. The method of claim 1, wherein the engine's non dedicated EGR cylinder(s) are run rich.

4. The method of claim 1, wherein the engine's non dedicated EGR cylinder(s) are run lean.

5. The method of claim 1, wherein the dedicated EGR cylinder is run at an air-fuel ratio richer than that of the main cylinders.

6. The method of claim 1, further comprising the step of modulating the amount of EGR delivered via the low pressure EGR loop.

7. The method of claim 1, wherein the step of determining a desired EGR rate is performed by using a control unit to receive data representing engine load.

8. The method of claim 1, wherein the step of providing EGR to all cylinders only from the dedicated EGR loop is performed by closing a valve on the low pressure EGR loop.

9. The method of claim 1, wherein the step of providing additional EGR to at least the main cylinders from the low pressure EGR loop is performed by providing two separate fresh air intake paths, each joining one of the EGR loops.

10. The method of claim 1, further comprising a connecting line between the two fresh air intake paths, and wherein the connecting line has a valve, and further comprising opening the valve when the low pressure EGR loop is closed.

11. A dual EGR loop exhaust gas recirculation (EGR) system to improve combustion efficiency of an internal combustion engine having a number of cylinders, comprising:
- one or more of the cylinders operable as dedicated EGR cylinder(s), such that all of its exhaust is recirculated as dedicated EGR, and thereby operating the remaining cylinders as main cylinders;
- a dedicated EGR loop for delivering the dedicated EGR to all cylinders by connecting to a first intake path;
- a low pressure EGR loop for delivering recirculated low pressure loop EGR from the main cylinders back to the main cylinders by connecting to a second intake path;
- wherein the main cylinders are configured to receive a mixture of fresh air and dedicated EGR gas, or to receive a mixture of fresh air, dedicated EGR gas and low pressure loop EGR gas;
- wherein each main cylinder has two intake ports, such that each main cylinder may receive a mixture of fresh air and dedicated EGR through one intake port and a mixture of fresh air and low pressure EGR through the other intake port; and
- a control unit operable to determine a desired EGR rate, and based on the desired EGR rate, to control the dedicated EGR loop and the low pressure EGR loop to either provide only dedicated EGR to all cylinders only from the dedicated EGR loop or to also provide additional EGR to at least the main cylinders from the low pressure EGR loop.

12. The system of claim 11, further comprising a valve on the low pressure EGR loop operable to close the low pressure EGR loop.

13. The system of claim 11, wherein the first intake path and the second intake path are joined upstream the intake ports by a connecting line.

14. The system of claim 13, further comprising a valve on the connecting line for closing fluid communication between the intake paths.

15. The system of claim 11, further comprising a throttle on the first intake path downstream the connection of the dedicated EGR loop and the first intake path.

* * * * *